June 9, 1959

G. M. W. BADGER 2,890,415

THERMOELECTRIC POWER MONITOR

Filed Sept. 12, 1956

2 Sheets-Sheet 1

GEORGE M. W. BADGER
INVENTOR.

BY Leon F. Herbert

June 9, 1959 G. M. W. BADGER 2,890,415

THERMOELECTRIC POWER MONITOR

Filed Sept. 12, 1956 2 Sheets-Sheet 2

GEORGE M. W. BADGER
INVENTOR.

BY Leon F. Herbert

United States Patent Office 2,890,415

Patented June 9, 1959

2,890,415

THERMOELECTRIC POWER MONITOR

George M. W. Badger, San Bruno, Calif., assignor to Eitel-McCullough, Inc., San Bruno, Calif., a corporation of California Application September 12, 1956, Serial No. 609,460

3 Claims. (Cl. 324—95)

This invention relates generally to a thermoelectric power monitor.

It is a general object of the present invention to provide a novel thermoelectric power monitor.

It is another object of the present invention to provide a power monitor which includes a metal loop and a lead forming a thermoelectric junction therewith.

It is a further object of the present invention to provide an evacuated thermoelectric power monitor.

It is a further object of the present invention to provide a thermoelectric power monitor which requires relatively simple auxiliary circuits.

The invention possesses other objects and features of advantage, some of which, with the foregoing, will be set forth in the following description of the invention. It is to be understood that the invention is not to be limited to the disclosure of a particular species, as other variant embodiments may be adopted within the scope of the claims.

Referring to the drawing.

Generally, the thermoelectric power monitor 11 comprises a metallic loop 23 which is adapted to be inserted into an electromagnetic field to extract power therefrom. The currents induced into the loop serve to heat the same. A lead is connected to the loop and forms a thermoelectric junction therewith. A current which is dependent upon the temperature of the junction is generated by the thermoelectric junction. The generated current is measured and its magnitude gives an indication of the intensity of the electromagnetic field strength.

Figure 1:
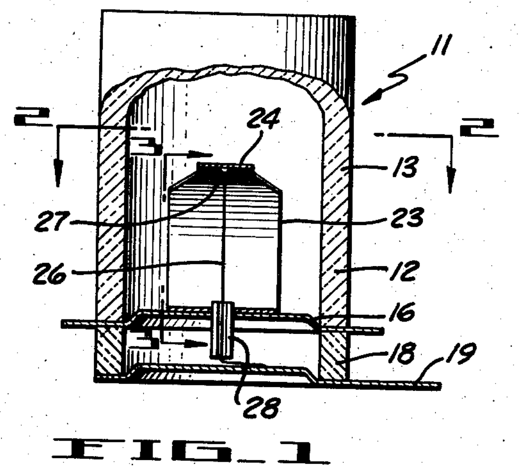
Figure 1 is a sectional view of a thermoelectric power monitor constructed in accordance with the invention.

Referring to Figure 1, the loop is housed within an evacuated envelope 12 made of any suitable dielectric material. Preferably, the envelope is made of a dense ceramic such as alumina or zircon type ceramic. The upper portion of the envelope 13 is illustrated as cup-shaped and of unitary structure. However, the envelope may be made from a cylinder with an end plate affixed thereto by well-known ceramic bonding techniques. For example, the ends of the cylinder and the edges of the end plate may be metalized by the molybdenum-manganese powder sintering process. The end plate may then be brazed to the cylinder with silver solder to form a vacuum joint.

A loop disk 16, which may, for example, be formed from a nickel sheet, is suitably brazed to the end of the ceramic envelope 12 after the end has been metalized. The disk 16 serves to carry the loop, as will be presently described.

A high alumina or zircon type ceramic spacer 18 is suitably bonded, as previously described, to the other side of the disk 16. A base or end disk 19 is suitably bonded to the lower end of the spacer 18. The disk 19 may also be formed from sheet nickel.

The metallic loop, made of any suitable metallic material, in conjunction with the lead to be presently described forms a thermoelectric junction which is secured to and carried by the disk 16. The loop may be formed by blanking a steel sheet, forming the same into a loop, and spot welding the end portions. A portion of the loop is preferably formed of reduced width whereby currents flowing through the loop tend to heat this portion to give localized heating. A thermoelectric junction is formed in the region of reduced cross-section 24. Thus, a wire 26 is suitably bonded 27, as, for example, by spot welding or soldering to the portion 24. The wire extends diametrically downward through a ceramic insulating sleeve 28 and is suitably attached to the base disk 19. Electrical connection to the loop is made through the disk 16. Electrical connection to the wire is made through the disk 19.

In operation, the loop is oriented whereby the magnetic lines of flux travel therethrough and serve to induce electric currents in the loop. The induced electrical currents serve to heat the loop, the heating being dependent on the current flow and resistance of the loop, as is well known. The loop attains its maximum temperature in the portion of restricted cross section where the resistance is highest. By varying this dimension, it is possible to obtain a desired temperature rise with current flow. For example, a gap may be formed at this portion and spanned by a thin wire formed of suitable material. The lead 26 then makes contact with the bridging portion of the wire to form a junction.

As previously indicated, the lead 26 travels diametrically across the loop. As a result, induced currents cancel in the wire 26, as indicated by the arrows 29, whereby no energy at the frequencies being monitored travels to the external measuring equipment.

The amount of magnetic field intercepted may be controlled by rotating the loop. When the plane of the loop is perpendicular to the lines of magnetic flux, the maximum induced currents are produced. When the plane of the loop is parallel with the magnetic flux, the induced currents are at a minimum.

Figure 4:
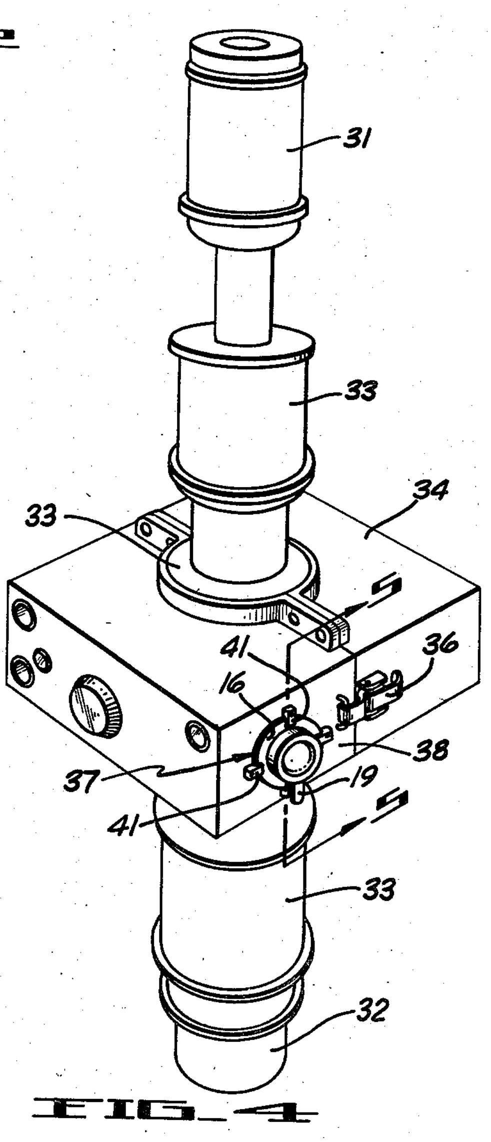
Figure 4 is a perspective view of a three cavity klystron of the type in which the resonant cavities have portions which lie within the evacuated envelope and portions which lie outside the same. One external cavity portion is illustrated, together with the thermoelectric power monitor of the invention mounted therein.
Figure 2:
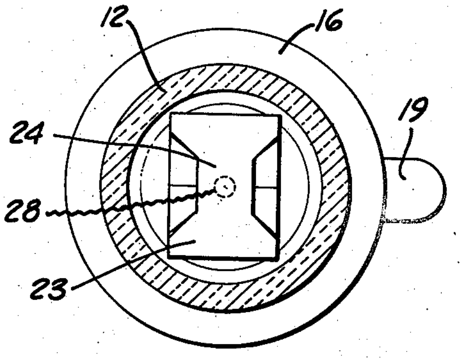
Figure 2 is a sectional view taken along the line 2—2 of Figure 1.
Figure 3:
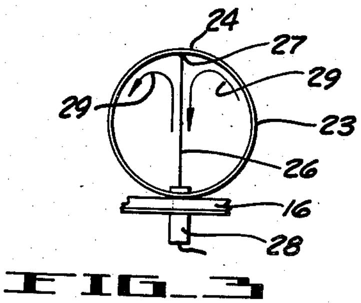
Figure 3 is a sectional view taken along the line 3—3 of Figure 1.

Referring to Figure 4, a three cavity klystron of the type which includes cavities having a central evacuated portion and an external portion is shown. The klystron illustrated includes an electron gun 31 at one end, a collector 32 at the other end, and a plurality of cavity resonators 33, all as is well-known in the art, for example as shown in the patent to R. L. Norton, et al., No. 2,619,611. The tube envelope in the region of the cavities is provided with a ceramic window whereby the microwave field travels outwardly into the external portion of the cavity. By way of example, an external cavity 34 is formed in two portions and is adapted to be clamped about the internal resonator portions 33 by means of a clamp 36. The thermoelectric monitor 11 is inserted into one wall of the cavity, as shown.

Figure 5:
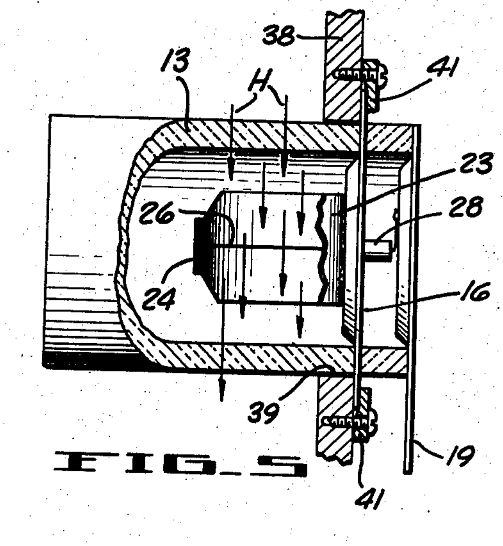
Figure 5 is a partial sectional view taken along the line 5—5 of Figure 4.

Referring particularly to Figure 5, a wall 38 of the cavity is shown. The wall 38 is provided with an opening 39 which accommodates the upper portion of envelope 13. The disk 16 rides against the outside of the wall and suitable clamping means 41 serve to hold the same against the wall and against rotation. The clamping means can be loosened to permit rotation of the power monitor to proper orientation and then tightened to hold the monitor securely in place. Suitable current indicating means are then connected between the disks 16 and 19.

Figure 6:
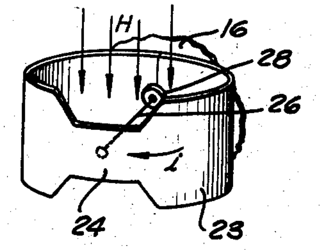
Figure 6 is a perspective view of the loop.
Figure 7:
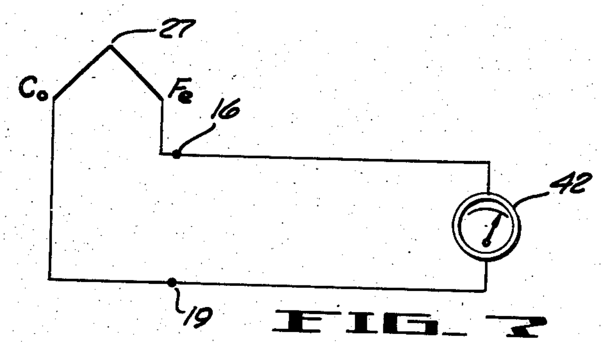
Figure 7 shows a schematic circuit diagram of a power monitoring circuit.

Referring to Figure 6, the loop is shown with the current *i* flowing therein and the magnetic field H passing therethrough.

As previously mentioned, the loop may be formed from an iron or stainless steel sheet. In this instance, the lead 26 is preferably made of constantan. Thus an iron constantan junction 27 is formed. A suitable microammeter 42 may be connected to receive and indicate the current generated by the thermocouple.

Figure 8:
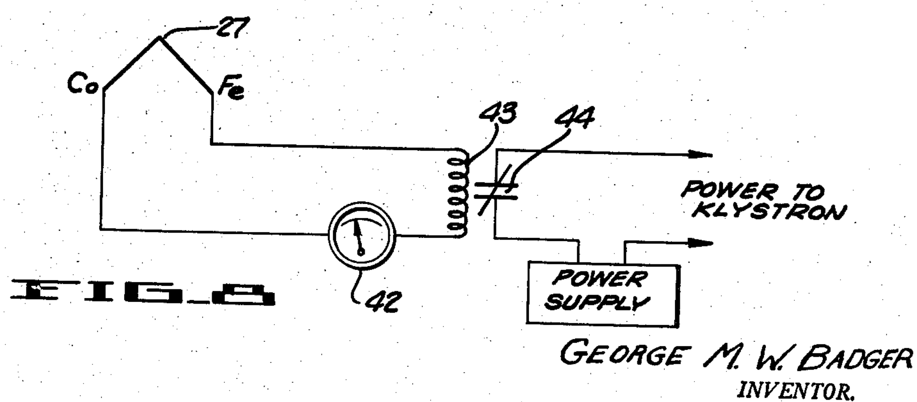
Figure 8 shows a schematic diagram of a suitable protective circuit associated with the power monitor of the invention.

Figure 8 shows a circuit which is suitable for both indicating the current generated by the meter 42 and for cutting off the power to the klystron when the electromagnetic field intensity (current generated) reaches a predetermined value. Thus, the current generated by the thermocouple flows through the coil 43 of the relay, as well as the microammeter 42. When the current exceeds a certain amount, the contact 44 opens thereby cutting off the power to the klystron. This safety feature is desirable, for the electromagnetic field may build up to a point where it becomes destructive.

Although the thermoelectric power monitor has been described in conjunction with a tuning cavity of a klystron, it is apparent that it may be used to monitor power in any type of cavity or to monitor other electromagnetic fields.

I claim:

1. A thermoelectric power monitor comprising an envelope including an upper cup-shaped portion, a spacer and an end disk bonded to the spacer, a loop disk disposed between the upper envelope portion and the spacer and bonded thereto, a metallic loop carried by said loop disk and electrically connected thereto, a wire secured to a point on said loop and forming a thermoelectric junction therewith, said wire extending diametrically across said loop, through said loop and loop disk in insulated relation thereto and having its other end electrically connected to the end disk, the electrical output from said thermoelectric junction appearing between said disks.

2. A thermoelectric power monitor of the type adapted to be inserted into a cavity resonator and serving to indicate the strength of the electromagnetic field therein comprising an envelope including a cup-shaped portion, a spacer and an end disk bonded to the spacer, a loop disk disposed between the upper envelope portion and the spacer and bonded thereto, said loop disk extending outwardly from the envelope and providing means for securing the monitor in the cavity, a metallic loop carried by said loop disk and electrically connected thereto, a wire secured to a point on said loop and forming a thermoelectric junction therewith, said wire extending diametrically across said loop, through said loop and loop disk and having its other end electrically connected to the end disk, and an insulating sleeve serving to receive said wire and insulate the same from the loop and loop disk, the electrical output from said thermoelectric junction appearing between said disks.

3. Apparatus as in claim 2 including means for adjustably holding the loop disk whereby the loop may be suitably oriented within the cavity resonator.

References Cited in the file of this patent

UNITED STATES PATENTS

| | | |
|---|---|---|
| 2,365,207 | Moles | Dec. 19, 1944 |
| 2,431,953 | McAninch | Dec. 2, 1947 |
| 2,435,597 | Moullin | Feb. 10, 1948 |
| 2,446,572 | Bull | Aug. 10, 1948 |
| 2,455,269 | Pierce | Nov. 30, 1948 |
| 2,473,779 | Benioff | June 21, 1949 |
| 2,488,378 | Coltman | Nov. 15, 1949 |